United States Patent [19]
Ohta et al.

[11] Patent Number: 5,579,294
[45] Date of Patent: Nov. 26, 1996

[54] MAGNETO-OPTICAL MEDIUM AND RECORDING AND/OR REPRODUCING APPARATUS THEREOF

[75] Inventors: Masumi Ohta; Isamu Nakao; Toshiki Udagawa, all of Tokyo; Atsushi Fukumoto, Kanagawa; Shunji Yoshimura, Tokyo, all of Japan

[73] Assignee: Sony Corporation, Tokyo, Japan

[21] Appl. No.: 299,544

[22] Filed: Sep. 1, 1994

Related U.S. Application Data

[60] Continuation of Ser. No. 971,068, Nov. 3, 1992, abandoned, which is a division of Ser. No. 831,935, Feb. 6, 1992, abandoned.

[30] Foreign Application Priority Data

Feb. 8, 1991 [JP] Japan ................................. 3-018070
Feb. 15, 1991 [JP] Japan ................................. 3-042890

[51] Int. Cl.$^6$ ..................................................... G11B 7/00
[52] U.S. Cl. ................................................ 369/58; 369/47
[58] Field of Search ................................. 369/58, 47, 59, 369/13, 53, 54, 48, 50

[56] References Cited

U.S. PATENT DOCUMENTS

| | | | |
|---|---|---|---|
| 4,800,550 | 1/1989 | Yamauchi | 369/47 |
| 5,168,482 | 12/1992 | Aratani et al. | 369/13 |
| 5,309,421 | 5/1994 | Fujisawa | 369/77.1 |

FOREIGN PATENT DOCUMENTS

| | | | |
|---|---|---|---|
| 0175308 | 9/1985 | European Pat. Off. .......... G11B 7/00 |
| 0258978 | 3/1988 | European Pat. Off. . | |
| 258978 | 3/1988 | European Pat. Off. . | |
| 0319004A2 | 6/1989 | European Pat. Off. ........ G11B 11/10 |
| 0318925A3 | 6/1989 | European Pat. Off. ........ G11B 11/10 |
| 0836913 | 2/1990 | European Pat. Off. ........ G11B 19/12 |
| 0415449A2 | 3/1991 | European Pat. Off. ......... G11B 1/10 |
| 0492581A2 | 7/1992 | European Pat. Off. ........ G11B 11/10 |
| 0492553A2 | 7/1992 | European Pat. Off. ........ G11B 11/10 |
| 2110459A | 6/1983 | United Kingdom ............ G11B 11/10 |

*Primary Examiner*—Georgia Y. Epps
*Assistant Examiner*—P. W. Huber
*Attorney, Agent, or Firm*—Limbach & Limbach L.L.P.

[57] ABSTRACT

An apparatus for recording and/or reproducing a magneto-optical recording medium having a recording layer, a reproducing layer and an intermediate layer for magnetically coupling the recording layer and the reproducing layer in a stationary state, in which the magnetic coupling between the recording layer and the reproducing layer is only able to take place in an area in which a temperature is increased to be higher than a predetermined temperature by the radiation of a light upon reproducing and in which a recorded information held in the recording layer is read out from the reproducing layer in the radiated area. This magneto-optical recording medium is characterized in that a Curie temperature of the intermediate layer is selected to be 150° C. or more. Also, an apparatus which performs the above-mentioned functions and additionally which is capable of recording and/or reproducing conventional magneto-optical discs which reproduce and/or record over the entire area of irradiation.

14 Claims, 13 Drawing Sheets

FIG. 1A (PRIOR ART)
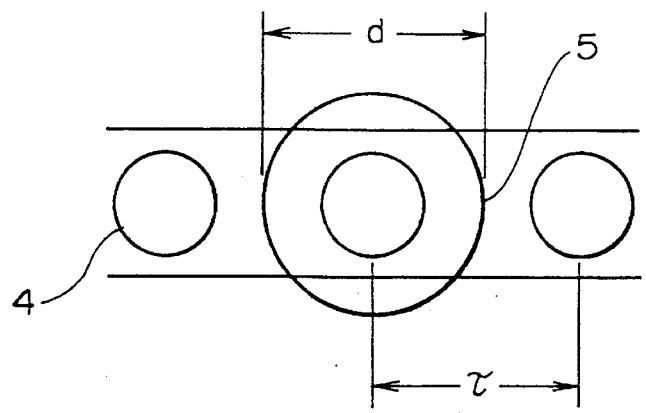
FIG. 1B (PRIOR ART)
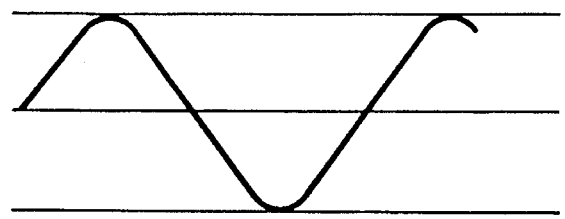
FIG. 1C (PRIOR ART)
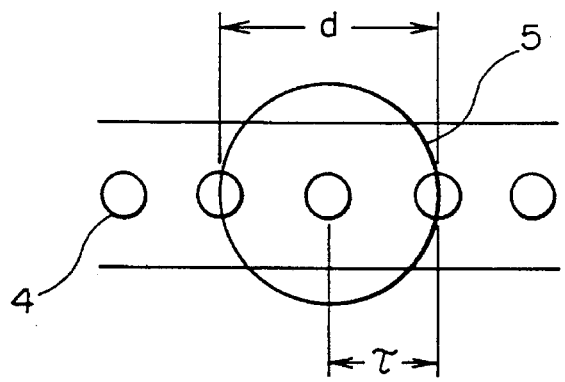
FIG. 1D (PRIOR ART)

MAGNETO-OPTICAL MEDIUM AND RECORDING AND/OR REPRODUCING APPARATUS THEREOF

This is a continuation of application Ser. No. 07/971,068 filed on Nov. 3, 1992, now abandoned, which is a divisional application of application Ser. No. 07/831,935 filed on Feb. 6, 1992, now abandoned.

BACKGROUND OF THE INVENTION

1. Field of the Invention

The present invention relates to a magneto-optical recording medium and a magneto-optical medium recording and/or reproducing apparatus capable of recording and/or reproducing both from a magneto-optical medium in which a reproduced signal is read out from only one portion of a light radiated area (laser beam spot) upon reproducing to thereby record and/or reproduce an information at high density and from a magneto-optical recording medium of the conventional system in which a reproduced signal is read out from substantially the whole area of the laser beam spot.

2. Description of the Prior Art

An erasable magneto-optical disc has a magneto-optical recording layer. When this magneto-optical layer is irradiated with a laser beam and then heated, the magnetization direction (recording pit) of the heated portion is converted into a magnetization direction corresponding to the external magnetic field associated with a recording information. In this way, an information signal can be recorded. Upon playback, the recorded information signal is played back by utilizing a Kerr effect in which a laser beam is irradiated on the track of the recording pit and a polarized plane of a reflected light is rotated by the magnetization direction. In the case of multi-layer magneto-optical discs having a reflecting layer in addition to the magneto-optical layer, a Faraday effect also is utilized.

A recording linear density of an information on the magneto-optical disc is determined by a carrier-to-noise (C/N) ratio of a reproduced signal. In the magneto-optical recording and/or reproduction of the conventional magneto-optical disc (hereinafter this conventional magneto-optical disc is referred to as an MO disc), as shown in FIG. 1, substantially the whole area of a beam spot 5, i.e., the laser beam light radiated area on the MO disc is employed as a reproduced signal detection area so that the linear recording density of the MO disc, which can be reproduced, is determined by the spot diameter of the laser beam.

If a diameter d of the laser beam spot 5 is smaller than a pitch τ of a recording pit 4 as shown in FIG. 1A, then two recording pits 4 cannot enter the laser beam spot 5 and a reproduced output has a waveform shown in FIG. 1B, thus making it possible to read the reproduced signal. However, as shown in FIG. 1C, if the recording pits 4 are formed at high density and the diameter d of the laser beam spot 5 becomes larger than the pitch τ of the recording pit 4, then two recording pits 4, for example, enter the same laser beam spot 5 simultaneously and therefore the waveform of the reproduced output becomes substantially constant as shown in FIG. 1D. As a consequence, the two recording pits 4 cannot be reproduced separately and the reproduction becomes impossible.

The spot diameter d depends upon a wavelength λ of the laser beam and an numerical aperture NA of an objective lens. Accordingly, it has been proposed to make the recording high in density by utilizing a laser light of short wavelength λ or by reducing the spot diameter d of the laser beam by increasing the numerical aperture NA of the objective lens. However, these proposals have unavoidable limits from a laser light source and optical system standpoint and these unavoidable limits hinder the magneto-optical disc from becoming high in recording density.

Similarly, a track density is mainly restricted by a crosstalk component from adjacent tracks. In the prior art, the amount of the crosstalk component depends upon the laser beam spot diameter d, which also hinders the the magneto-optical disc from becoming high in recording density.

The assignee of the present application has previously proposed a novel magneto-optical disc in which a readable linear recording density and the track density can be increased without varying the laser beam spot diameter and a method of reproducing such novel magneto-optical disc (see Japanese Laid-Open Patent Publication No. 3-88156 corresponding to U.S. Pat. No. 5,168,482). This novel magneto-optical disc will hereinafter be referred to as an MSR (magneto-optical super resolution) disc.

In this MSR disc, by effectively utilizing a temperature distribution provided by the relative movement of the magneto-optical recording medium and the reproducing laser spot 5, the recording pits 4 of the magneto-optical recording medium will be read only from a predetermined temperature area upon playback, thereby a resolution and density can be increased.

Two types of MSR disc systems are the rear aperture detection type and the front aperture detection type.

First, the rear aperture detection type MSR disc reproducing system will be described with reference to FIGS. 2A and 2B.

FIG. 2A is a schematic plan view illustrating a recording pattern of a magneto-optical recording medium 10 and FIG. 2B is a schematic cross-sectional view illustrating the magnetization state of the magneto-optical recording medium 10. In this case, as shown in FIG. 2A, the magneto-optical recording medium 10 is moved in the direction shown by an arrow D relative to the laser beam spot 5 formed by the laser beam. As shown in FIG. 2B, for example, the magneto-optical recording medium 10, has three layers including a reproducing layer 11 (formed of at least a vertical magnetization layer), and a recording layer 13 and, more preferably, an intermediate layer 12 interposed between the two layers 11 and 13. In FIG. 2B, solid line arrows schematically indicate the directions of the magnetic moment and in the illustrated example, the downward arrows indicate initial state, e.g., "0" in binary value. Further, in FIG. 2B, the upward arrows, i.e., magnetic domains formed by the upward magnetization indicate "1" of binary value and in this state, an information recording pit 4 is formed at least on the recording layer 13 in the form of "1".

A reproducing mode in such magneto-optical recording medium 10 will be described below.

Initially, by the application of an initialized magnetic field Hi from the outside, the reproducing layer 11 is magnetized in the downward direction in FIG. 2B and is thereby initialized. That is, magnetization of the reproducing layer 11 becomes uniform, i.e. uniformly "0," over pits and non-pit areas. After this initialization of the reproducing layer 11, the magnetization directions of the reproducing layer 11 and the recording layer 13 are held in the opposite direction by magnetic walls produced in the intermediate layer 12 in the area of the recording pits 4, where, the recording layer has a value of "1." These pits in which the recording and reproducing layers exhibit opposing magnetization directions are called latent image recording pits 81.

On the other hand, the magneto-optical recording medium 10 is supplied at least at its reproducing portion with a reproducing magnetic field $H_r$ whose direction is opposite to that of the initialized magnetic field $H_i$. In this state, when the area having a latent image recording pit 81 comes under the laser beam spot 5, its temperature will increase due to the laser irradiation. Portions of the surface of the medium 10 which are irradiated for a longer time reach a higher temperature. The hatched high temperature area 14, shown in FIG. 2A represents a portion of the surface of the medium 10 which has been so heated by the laser beam spot 5. It will be noted that the high temperature area 14 makes up only a portion of the entire laser beam spot 5. When a latent image recording pit 81 reaches this high temperature area 14, the magnetic wall of the intermediate layer 12 breaks down and the magnetization of the recording layer 13 is transferred to the reproducing layer 11 by an exchange force, whereby the latent image recording pit 81 existing in the recording layer 13 is embossed on the reproducing layer 11 as the reproducible recording pit 6.

Accordingly, if the rotation of the polarizing plane of the laser beam spot 5 by the Kerr effect due to the magnetization direction in the reproducing layer 11 or due to the Faraday effect is detected, then the recording pit 4 can be read out. However, unless a latent image recording pit 81 has reached the high temperature area 14 of the laser beam spot 5, the latent image recording pit 81 is not embossed on the reproducing layer 11. Therefore the reproducible recording pits 6 exist only in the high temperature area 14 of narrow width. As a consequence, even when a plurality of recording pits 4 are entered into the laser beam spot 5, that is, even in the magneto-optical recording medium 10 of high density recording type, only the reproducible recording pits 6 can be read out, which can make it possible to perform the reproduction at high resolution.

In order to carry out the above-mentioned playback of high resolution, the initialized magnetic field $H_i$, the reproduced magnetic field $H_r$, coercive force of each magnetic layer, thickness, magnetization, magnetic wall energy or the like are selected in response to temperatures of the high temperature area 14 and of the low temperature area 15 within the laser beam spot 5. More specifically, assuming that $H_{C1}$ represents a coercive force of the reproducing layer 11, $M_{S1}$ a saturated magnetization thereof and $h_1$ a film thickness thereof, then a condition for initializing only the reproducing layer 11 is given by the following equation (1):

$$H_i > H_{C1} + \rho_{w2}/2M_{S1}h_1 \quad (1)$$

where $\rho_{w2}$ is the magnetic wall energy between the reproducing layer 11 and the recording layer 13.

Further, assuming that $H_{C3}$ represents a coercive force of the recording layer 13, $M_{S3}$ a saturated magnetization thereof and $h_3$ a film thickness thereof, then a condition such that the information of the recording layer 13 is maintained by the magnetic field is given by the following equation (2):

$$H_i < H_{C3} - \rho_{w2}/2M_{S3}H_3 \quad (2)$$

In order to maintain the magnetic wall provided by the intermediate layer 12 between the reproducing layer 11 and the recording layer 13 even after the initialized magnetic field Hi, the condition expressed by the following equation (3) must be established:

$$H_{C1} > \rho_{w2}/2M_{S1}H_1 \quad (3)$$

Then, at a temperature $T_H$ selected within the high temperature area 14, the condition expressed by the following equation (4) must be satisfied:

$$H_{C1} - \rho_{w2}/2M_{S1}H_1 < H_r < H_{C1} + \rho_{w2}/2M_{S1}h_1 \quad (4)$$

By the application of a reproducing magnetic field $H_r$ which satisfies the above-mentioned equation (4), the magnetization of the latent image recording pit 81 of the recording layer 13 can be transferred, i.e., embossed on the reproducing layer 11 only at its portion where the magnetic wall provided by the intermediate layer 12 exists.

While the magneto-optical recording medium 10 of the MSR type is composed of the reproducing layer 11, the intermediate layer 12 and the recording layer 13 in a trilayer structure, the magneto-optical recording medium 10 is not limited to the trilayer structure and may be applied to a four-layer structure in which a reproducing auxiliary layer 91 is provided on the intermediate layer 12 side of the reproducing layer 11 as shown in a schematic enlarged cross-sectional view forming FIG. 3.

The reproducing auxiliary layer 91 assists the characteristics of the reproducing layer 11. By this reproducing auxiliary layer 91, the coercive force of the reproducing layer 11 can be compensated for at room temperature, and the magnetization of the reproducing layer 11 arranged by the initialized magnetic field $H_i$ can stably exist regardless of the existence of the magnetic wall. Further, the coercive force rapidly decreases near a reproducing temperature so that the magnetic wall confined within the intermediate layer 12 will spread to the reproducing auxiliary layer 91. Also, the magnetic wall will still break down satisfactorily, even with the auxiliary layer 91, and thereby the recording pit 4 can be embossed satisfactorily.

When the magneto-optical recording medium 10 is formed in a four-layer structure fashion in which the reproducing auxiliary layer 91 is provided as described above, the coercive force $H_{C1}$ of the reproducing layer 11 is replaced with a coercive force $H_{CA}$ given by the following equation (5) and $\rho_{w2}/M_{S1} h_1$ is replaced with $\rho_{w2}/(M_{S1}h_1+M_{SS}h_S)$:

$$H_{CA}=(M_{S1}h_1 H_{C1}+M_{SS}h_S H_{CS})/(M_{S1}h_1+M_{SS}h_S) \quad (5)$$

(inequality of $H_{C1}<H_{CA}<H_{CS}$ is established in the above-mentioned rear aperture detection type MSR disc) where $M_{SS}$, $h_S$ and $H_{CS}$ represent the saturated magnetization, the film thickness and the coercive force of the reproducing auxiliary layer 91, respectively.

The MSR disc of the front aperture detection type will be described next with reference to FIGS. 4A and 4B. FIG. 4A is a schematic top view illustrative of the recording pattern of the magneto-optical recording medium 10 and FIG. 4B is a schematic cross-sectional view illustrative of the magnetization state. In FIGS. 4A and 4B, like parts corresponding to those of FIGS. 2A and 2B are marked with the same reference numerals and therefore need not be described in detail. In this case, the initialized magnetic field $H_i$ is not required.

The reproducing mode of such magneto-optical recording medium 10 will be described. In this case, the following equation (6) must be established in the high temperature area 14 so that, even within the laser beam spot 5, the magnetizations of the reproducing layer 11 which reach the high temperature area 14 are converted to the downward direction in FIG. 4B by the reproducing magnetic field $H_r$ applied from the outside, thereby the recording pit 4 in the reproducing layer 11 is no longer reproducible. That is, in this MSR disc of the front aperture detection type, the resolution can be increased by reproducing recording pits 4 only within the low temperature area 15 of the beam spot 5.

$$H_r > H_{C1} + \rho_{w2}/2M_{s1}h_1 \qquad (6)$$

At that time, under the condition that the recording pit 4 is unreproducible, various conditions such as a coercive force or the like are set in such a fashion that the recording pit 4 is left as a latent image recording pit 81 in the recording layer 13. Thus, at room temperature, the magnetization of the recording layer 13, i.e., the recording pit 4 will be transferred to the reproducing layer 11 and returns to the reproducible condition.

According to the above-mentioned MSR discs of the rear aperture detection type and the front aperture detection type, since the recording pit in the area of one portion of the reproducing laser beam spot is reproduced, the resolution in the playback mode can be improved.

Further, it has been proposed that a magneto-optical recording medium be made in which the above-mentioned two MSR discs of the rear aperture detection type and the front aperture detection type are combined and the zones of varying temperature within a laser beam spot are utilized to further increase density and resolution. Specifically, the area of a magneto-optical recording medium under the laser beam spot 5 will have a high temperature area 14, an intermediate temperature area 16 and a low temperature area 15 (shown in FIG. 5). This allows the high temperature area 14 to function as the MSR disc of the front aperture detection type described in FIG. 4 and also to thereby allow the intermediate temperature area 16 and the low temperature area 15 to function as the two temperature areas necessary for a rear aperture MSR as described in connection with FIG. 2.

According to the MSR disc provided by the combination of the rear aperture detection type MSR disc and the front aperture detection type MSR disc, since the reproducible recording pit 19 as shown by the hatched area in FIG. 5 is limited in the narrow intermediate temperature area 16 sandwiched between the high temperature area 14 and the low temperature area 15, the resolution in the playback mode can be improved more.

Incidentally, it is preferable that the MSR disc suitable for recording and reproducing of high resolution can be recorded and/or reproduced by an ordinary magneto-optical disc drive apparatus according to a recording and/or reproducing system which will be described below with reference to FIGS. 6 and 7.

That is, for disc medium used in the data storage such as external storage of a computer, in order to facilitate the data processing and the data access, the track area on a disc medium D is divided at every sector S of a proper length so that data can be processed in units defined by the sector S as shown in FIG. 6. Then, sector control information such as a physical address on the disc D or the like are recorded on each sector S and the sector control information is written in advance in the disc as an emboss signal.

FIG. 7 shows an ISO standard sector format of the WO (write once optical disc)/MO (erasable type optical disc). As shown in FIG. 7, one sector is composed of a header portion HD and a recording data portion DA, and the header portion HD is recorded (pre-formatted) on the optical disc medium in advance as the emboss signal as earlier noted. The header portion HD is composed of a sector synchronizing (sync.) portion and an address portion. The sector sync. portion is used to relatively identify the interval between the sectors and sector control information such as physical address on the disc or the like are recorded on the address portion. The physical address is composed of, for example, a track address and a sector address. In some cases, physical addresses might be sectors having serial numbers. The recording data is recorded only in the recording data portion DA in association with the sector control information of the header portion HD (associated information is stored in a directory area).

However, since the magneto-optical recording medium, particularly, the magneto-optical recording medium of the front aperture detection type is arranged so as to read the recorded signal by changing the magnetization state of the reproducing layer in the playback mode, the magnetic characteristic thereof is changed at a relatively low temperature in such a manner that the magnetization is changed under a predetermined temperature condition. Accordingly, if the above magneto-optical recording medium is recorded and/or reproduced by the ordinary magneto-optical disc drive apparatus, the magnetic characteristic becomes unstable and a reproduced output fluctuates. There is then the risk that the recorded signal cannot be played back precisely.

Furthermore, considering the recording and/or reproducing apparatus of the MSR disc, it is preferable that the MO disc, which is now widely and commercially available on the market, can be recorded and/or reproduced by this recording and/or reproducing apparatus. In that case, it is preferable that the recording and/or reproducing apparatus can use common hardware for recording and/or reproducing the above two discs, thereby simplifying the arrangement.

OBJECTS AND SUMMARY OF THE INVENTION

Therefore, it is an object of the present invention to provide an improved magneto-optical medium and apparatus for recording and/or reproducing a magneto-optical medium in which the aforesaid shortcomings and disadvantages encountered with the prior art can be eliminated.

More specifically, it is an object of the present invention to provide a magneto-optical recording medium which can be recorded and/or reproduced at high density and which can be recorded and/or reproduced by a conventional magneto-optical recording and/or reproducing apparatus.

It is another object of the present invention to provide a magneto-optical recording and/or reproducing apparatus of a simplified arrangement capable of recording and/or reproducing a magneto-optical medium at high density and which can also perform conventional magneto-optical recording and/or reproducing.

As a first aspect, a magneto-optical recording medium of the present invention is comprised of at least a recording layer, a reproducing layer and an intermediate layer interposed between the recording layer and the reproducing layer, in which a recorded signal is read out by changing the magnetization state of the reproducing layer. In this magneto-optical recording medium, a Curie temperature of the intermediate layer is selected to be 150° C. or more.

As a second aspect, in a magneto-optical disc recording and/or reproducing apparatus of the present invention, a channel clock is switched when the MSR disc to which the front aperture detection type or rear aperture detection type reproducing method is applied is recorded and/or reproduced or when the MO disc is recorded and/or reproduced.

The preceding and other objects, features, and advantages of the present invention will become apparent from the following detailed description of illustrative embodiments thereof to be read in conjunction with the accompanying

BRIEF DESCRIPTION OF THE DRAWINGS

FIGS. 1A through 1D are respectively schematic diagrams used to explain a relation between a laser beam spot diameter and a recording density of a reproducible recording pit;

DESCRIPTION OF THE PREFERRED EMBODIMENTS

Figure 8:
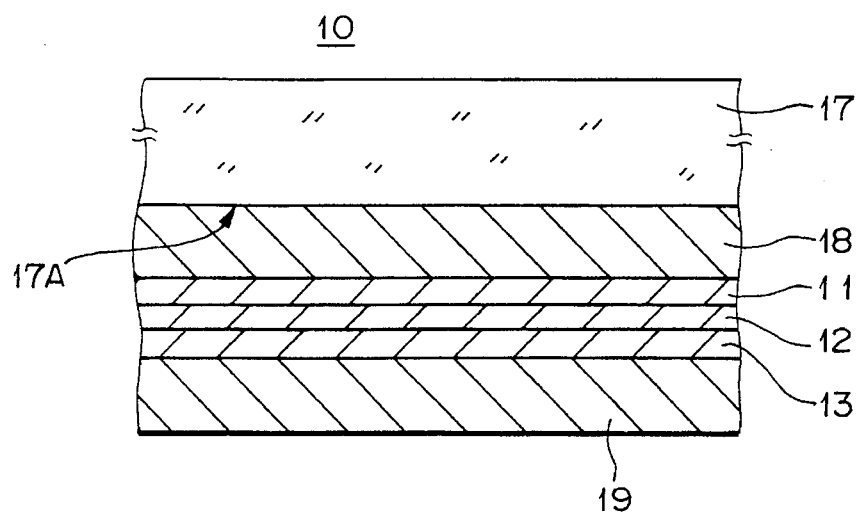
FIG. 8 is a schematic cross-sectional view illustrative of an embodiment of a magneto-optical recording medium according to the present invention.

Referring to the drawings in detail and initially to FIG. 8, an embodiment of a magneto-optical recording medium 10 according to the present invention will be described in detail. In this case, the magneto-optical recording medium 10 is the MSR disc of the front aperture detection type. As shown in FIG. 8, a substrate 17 is made of a transparent material such as polycarbonate (PC) or the like. On one major surface of the substrate 17, there are deposited a dielectric layer 18 made of, for example, an SiN layer having a thickness of 800 Å, a reproducing layer 11, an intermediate layer 12, a recording layer 13 and a surface protecting layer 19 having a thickness of 800 Å by some suitable method such as the sputtering-process or the like, in that order.

In the ordinary magneto-optical drive apparatus, the revolution rate of the magneto-optical recording medium is 2400 r.p.m., a recording innermost periphery r is 30 mm, an upper limit of environmental temperature is 50° C. and an upper limit of the laser output is 1.5 mW according to the standards of ISO (International Organization for Standardization). When these standardized values are associated with the above-mentioned MSR disc, then the rise of temperature is about 100° C. in the recording innermost periphery. Considering the environmental temperature, the temperature is assumed to rise up to about 150° C. In the magneto-optical recording medium 10 according to the present invention, a Curie temperature $T_{C2}$ of the intermediate layer 12 is selected to be 150° C. or more so that, when this magneto-optical recording medium 10 is utilized in the ordinary magneto-optical disc drive apparatus, the temperature of the magneto-optical recording medium 10 will not exceed the Curie temperature $T_{C2}$ of the intermediate layer 12.

More specifically, even when the above-mentioned MSR disc 10 is utilized by the ordinary magneto-optical disc drive apparatus, it is possible to reliably avoid fluctuation of reproduced output due to the influence exerted on the recording pit by the erasure of magnetic characteristics of the intermediate temperature based on temperature dependence. Therefore, the magnetizations of the respective magnetic layers, particularly, the magnetization of the intermediate layer 12 can be held reliably so that this MSR disc can be accurately and positively recorded and/or reproduced by the ordinary magneto-optical disc drive apparatus.

In this embodiment, the reproducing layer 11 is made of GdFeCo and 300 Å in thickness, and the recording layer 13 is made of TbFeCo or the like and 400 Å. Then, the intermediate layer 12 is 200 Å in thickness, for example, and the composition thereof is, for example, $\{Tb(Fe_{0.95}Co_{0.05})\}_{0.35}Al_{0.05}$ of, the TbFeCoAl system. The Curie temperature $T_{C2}$ thereof is selected to be 150° C.

Figure 9:
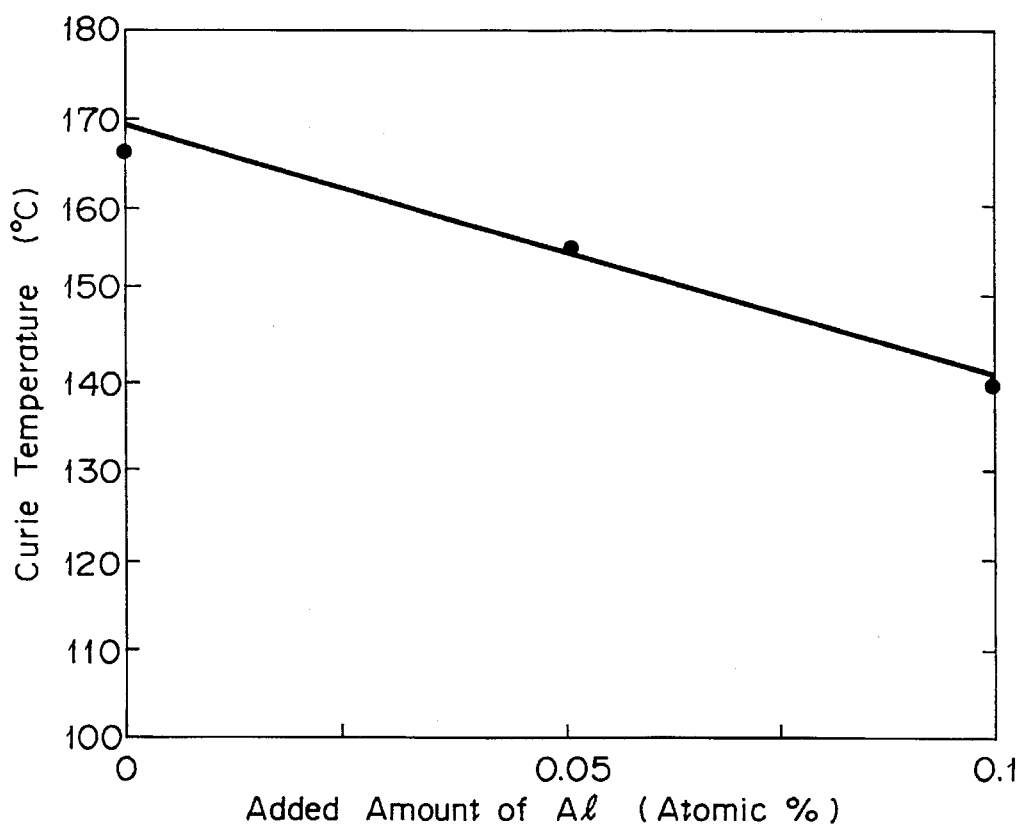
FIG. 9 is a graph graphing the change of Curie temperature as the composition is changed in accordance with an adding amount of Al to $Tb_{0.25}(Fe_{0.95}Co_{0.05})_{0.75}$.

FIG. 9 shows a graph graphing the change of Curie temperature when z in $(Tb_{0.25}(Fe_{0.95}Co_{0.05})_{0.75})_{1-z}Al_z$ was changed. From FIG. 9, it can be understood that this Curie temperature $T_{C2}$ is proper because the Curie temperature is lowered in proportion to the increase of the containing amount of Al in the TbFeCoAl system.

Figure 10:
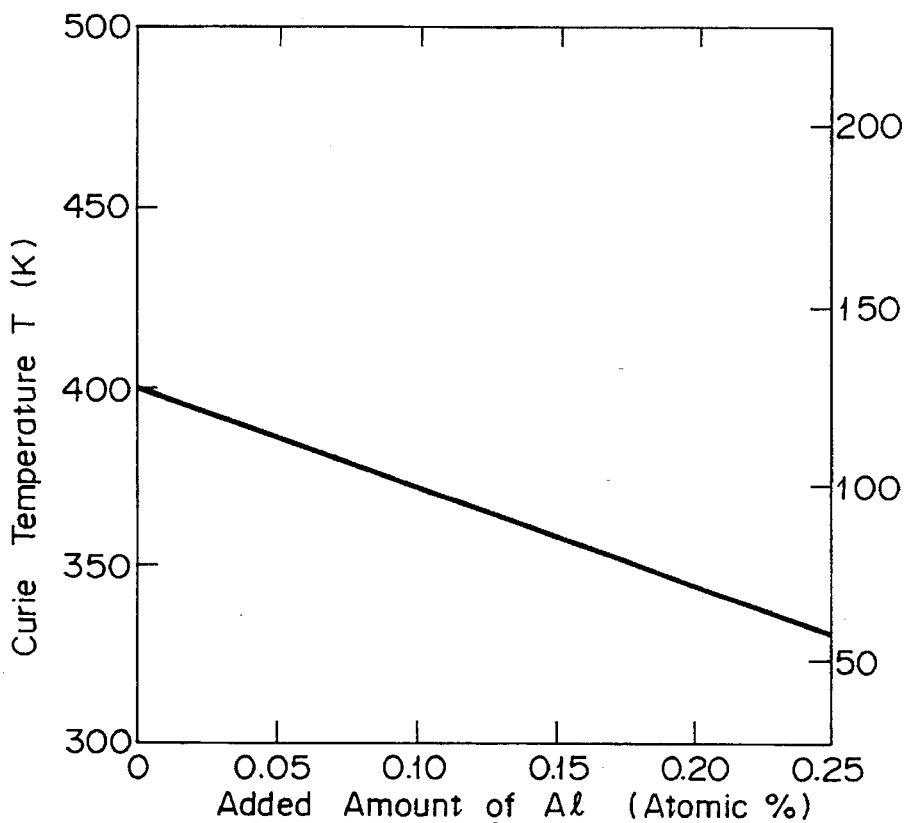
FIG. 10 is a graph graphing the change of Curie temperature as the composition is changed in accordance with an adding amount of Al to $Tb_{0.3}Fe_{0.7}$.
Figure 11:
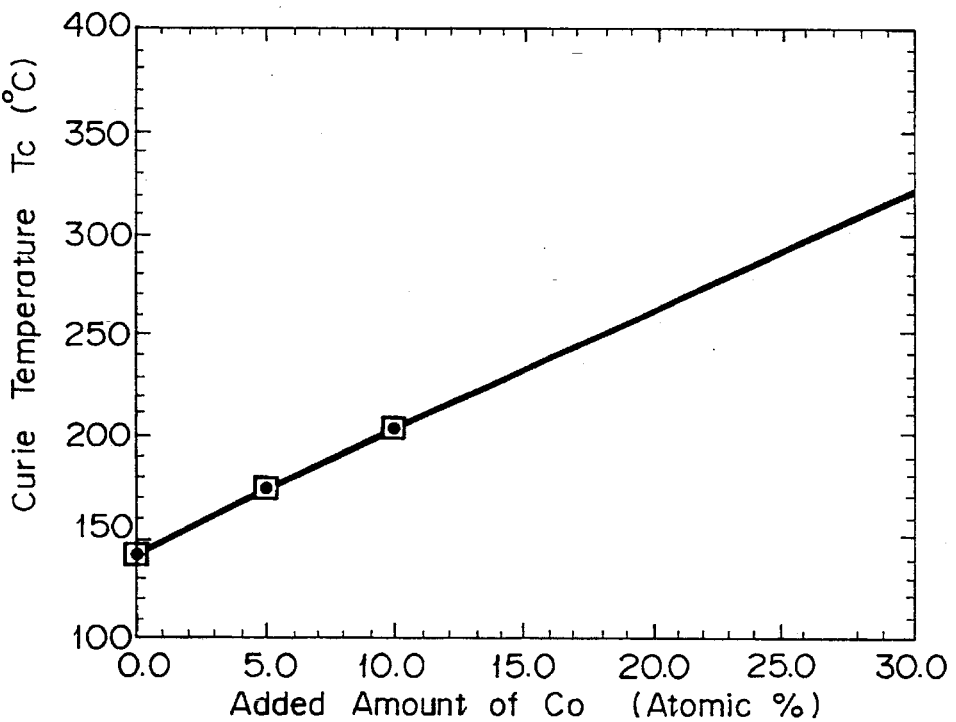
FIG. 11 is a graph graphing the change of Curie temperature as the composition is changed in accordance with an adding amount of Co to $Tb_{0.25}Fe_{0.75}$.

FIG. 10 is a graph graphing the change of Curie temperature when z in $(Tb_{0.3}Fe_{0.7})_{1-z}Al_z$ was changed. As shown in FIG. 10, it can be appreciated that the Curie temperature is lowered in accordance with the increase of z, i.e., the amount of Al in the TbFeAl system. On the other hand, FIG. 11 is a graph graphing the change of Curie temperature when z in $Tb_{0.25}(Fe_{1-z}Co_z)_{0.75}$ was changed. As shown in FIG. 10, it can be understood that the Curie temperature is lowered in proportion to the increase of the amount of Co. If the composition ratio of various materials is examined as described above, then it is possible to select the Curie temperature to be a predetermined one, i.e., 150° C. or more.

Since the Curie temperature Tc of the intermediate layer 12 is selected to be 150° C. as described above, it is to be understood that this MSR disc can be normally recorded and/or reproduced by the ordinary magneto-optical disc drive apparatus.

Figure 2A:
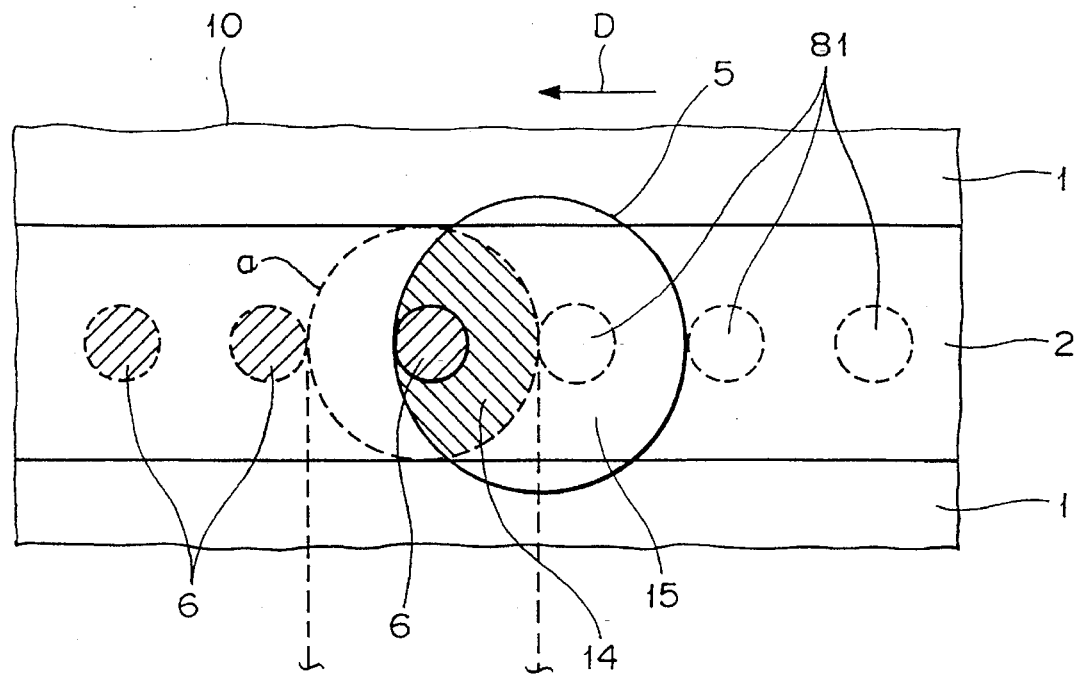
FIGS. 2A and 2B are respectively schematic diagrams used to explain an MSR disc of a relief type.
Figure 2B:
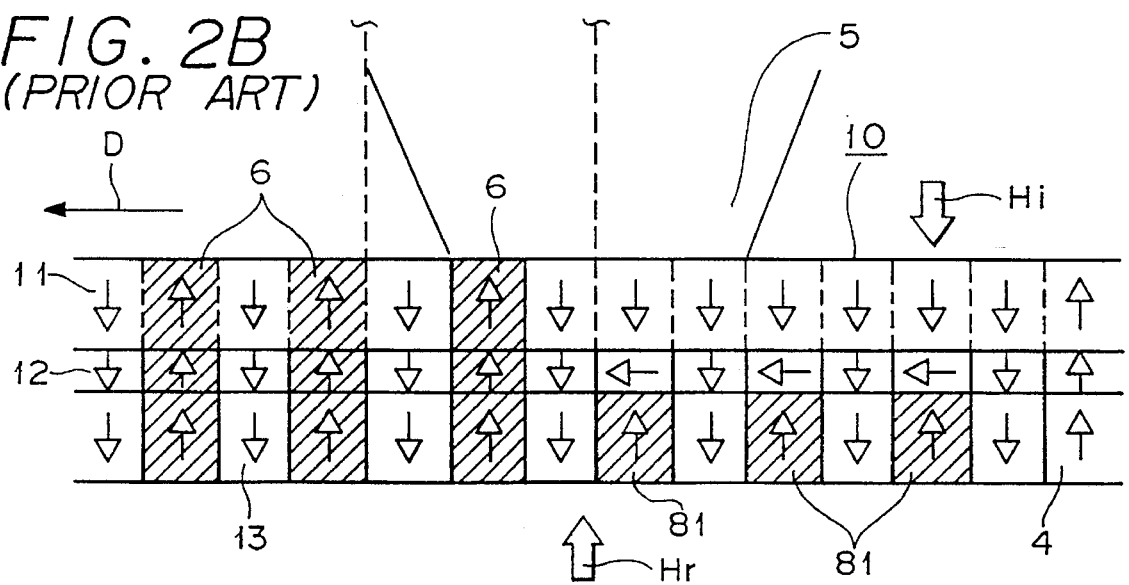
Figure 3:
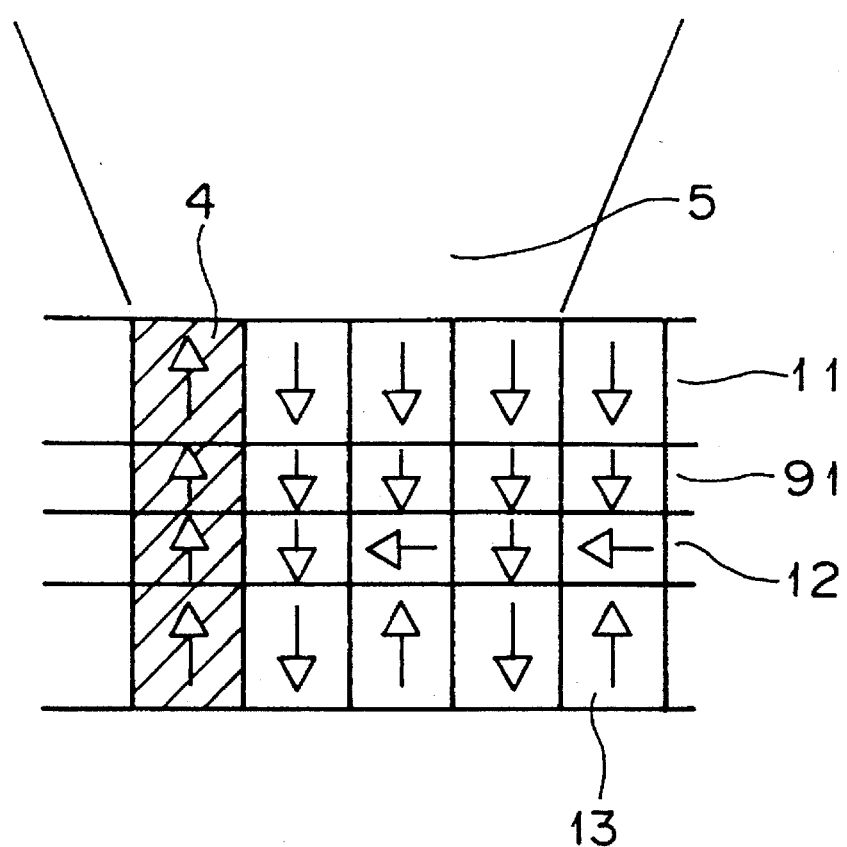
FIG. 3 is a schematic cross-sectional view illustrative of a magneto-optical recording medium.
Figure 5:
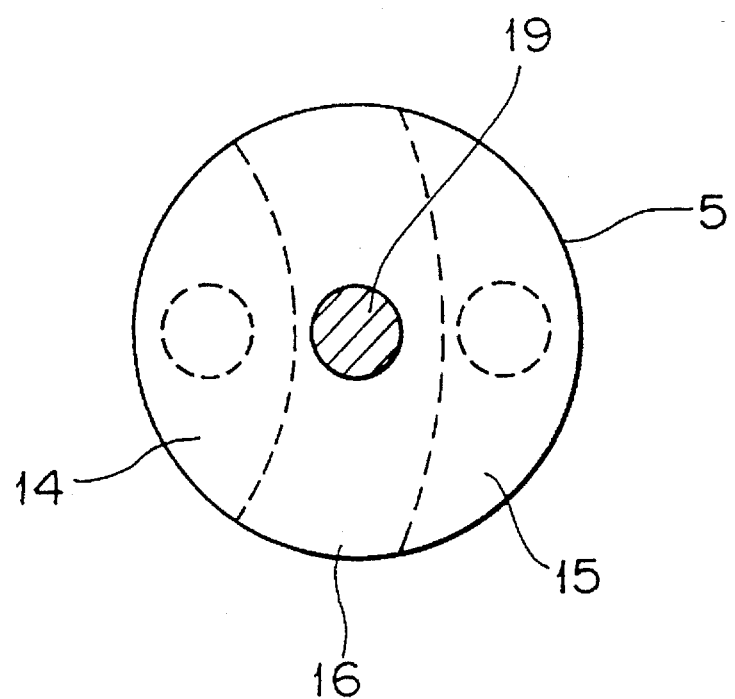
FIG. 5 is a schematic diagram used to explain an MSR disc of other type.
Figure 6:
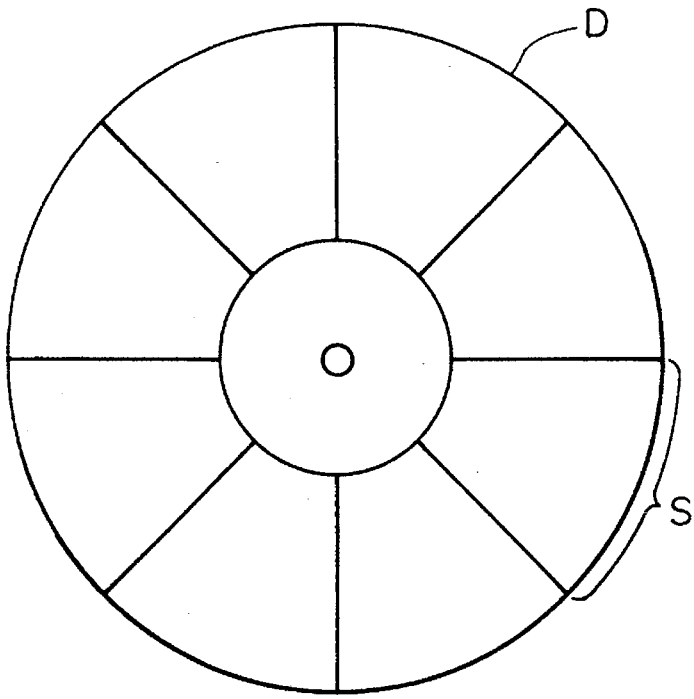
FIG. 6 is a schematic diagram showing an example of a sector format of the magneto-optical disc.
Figure 7:
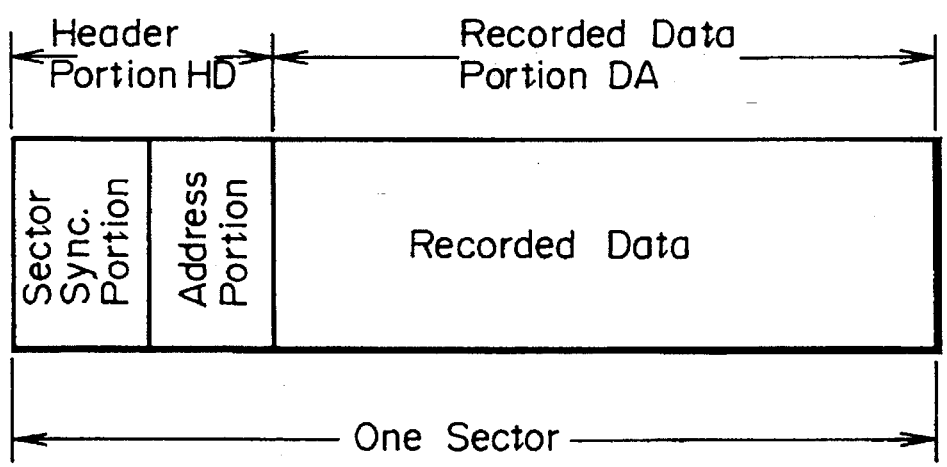
FIG. 7 is a diagram showing a format of one sector.

While a magneto-optical recording medium suitably applied to the MSR disc of the front aperture detection type is described in the above-mentioned embodiment of the present invention, the present invention is not limited to the magneto-optical recording medium thus arranged and various modifications may be possible. The present invention can be applied to the magneto-optical recording medium of the MSR type serving as both rear aperture detection type and front aperture detection type which can achieve the playback of high resolution. In this embodiment the magnetic layer of the magneto-optical recording medium is formed as a four-layer structure formed of the reproducing layer 11, the reproducing auxiliary layer 91, the intermediate layer 12, the recording layer 13 or the like as, for example, shown in FIG. 3. The recording pit is embossed on the reproducing layer 11 only at its narrow area of the predetermined temperature range as described in FIG. 5, by selecting the Curie temperature $T_{C2}$ of the reproducing auxiliary layer 91 to be 150° C. or more. In this way, the magnetic characteristics can be prevented from being fluctuated at the relatively low temperature conventional systems and the magneto-optical disc drive apparatus can produce a stable reproduced output, which can therefore effect the accurate and reliable recording and/or reproduction in both conventional and high density systems.

As described above, in the magneto-optical recording medium 10 of the present invention, the Curie temperature $T_{C2}$ of the intermediate layer 12 is selected to be 150° C. or more so that, even when this magneto-optical recording medium is utilized in the ordinary magneto-optical disc drive apparatus, the temperature of the magneto-optical recording medium 10 will not exceed the Curie temperature $T_{C2}$ of the intermediate layer 12. Thus, the fluctuation of the reproduced output or the like due to the temperature dependence of the magnetic characteristics of the intermediate layer 12 can be avoided positively and the recording pit 4 of the recording layer 13 can be reliably held in the reproducing layer 11, which enables the magneto-optical recording medium of this invention to be recorded and/or reproduced even by the ordinary magneto-optical disc drive apparatus accurately and reliably.

An apparatus for recording and/or reproducing the above-mentioned magneto-optical recording medium according to the present invention will hereinafter be described below.

Referring to FIG. 12, there is a magneto-optical disc 20 which might be an MSR disc to which the above-mentioned front aperture detection type or rear aperture detection type reproducing method is applied or an MO disc. In the case of this example, the magneto-optical disc 20 is rotated at a constant revolution rate, i.e., in a constant angular velocity (CAV) fashion. The revolution rate of the MSR disc and the MO disc is selected to be the same value, e.g., 2400 r.p.m. Also, the MSR disc and the MO disc are the same in size and may be rotated at a constant linear velocity (CLV) fashion.

In this embodiment, as earlier noted, the sector number of the disc per track and the sector format of the MSR disc and the MO disc are the same, that is, they are in accordance with the ISO standard sector format. The pre-formatted portions of the header portion HD of the MSR disc and the MO disc are equal to each other.

In the case of this embodiment, the MSR disc or the MO disc have the same data format such as the recording modulation system of information or the like and the MSR disc has the linear recording density of recording data higher than that of the MO disc, for example, twice the density. However, the linear recording density of the MSR disc is selected to be equal to that of an MO disc in the pre-formatted portion recorded by the emboss signal because the emboss signal is recorded on the pre-formatted portion to which the reproducing method of the front aperture detection type or rear aperture detection type cannot be applied. Accordingly, in the case of MSR disc, the recording density is different at the header portion HD and the recording data portion DA.

The MSR disc to which the reproducing method of the front aperture detection type is applied might be such one that the recording layer, for example, is made of TbFeCo, the intermediate layer is made of TbFeCoAl and the reproducing layer is made of GdFeCo. Further, the MSR disc to which the reproducing method of the rear aperture detection type is applied might be such one that the recording layer, for example, is made of TbFeCo, the intermediate layer is made of GdFeCo, the reproducing auxiliary layer is made of TbFeCoAl and the reproducing layer is made of GdFeCo.

If the MSR disc is not recorded and/or reproduced by the MO disc recording and reproducing apparatus, then it is possible to use such an intermediate layer whose Curie temperature is lower than 150° C., for example, about 120° C.

Further, in the case of this embodiment, pre-grooves for tracking are formed on the disc and these pre-grooves are formed on the MSR disc and the MO disc in accordance with the common specification. The tracking method is not limited to the method using the pre-grooves and various well-known methods can be applied.

Furthermore, a disc cartridge has an identifying aperture to discriminate the MSR disc and the MO disc.

Figure 12A:
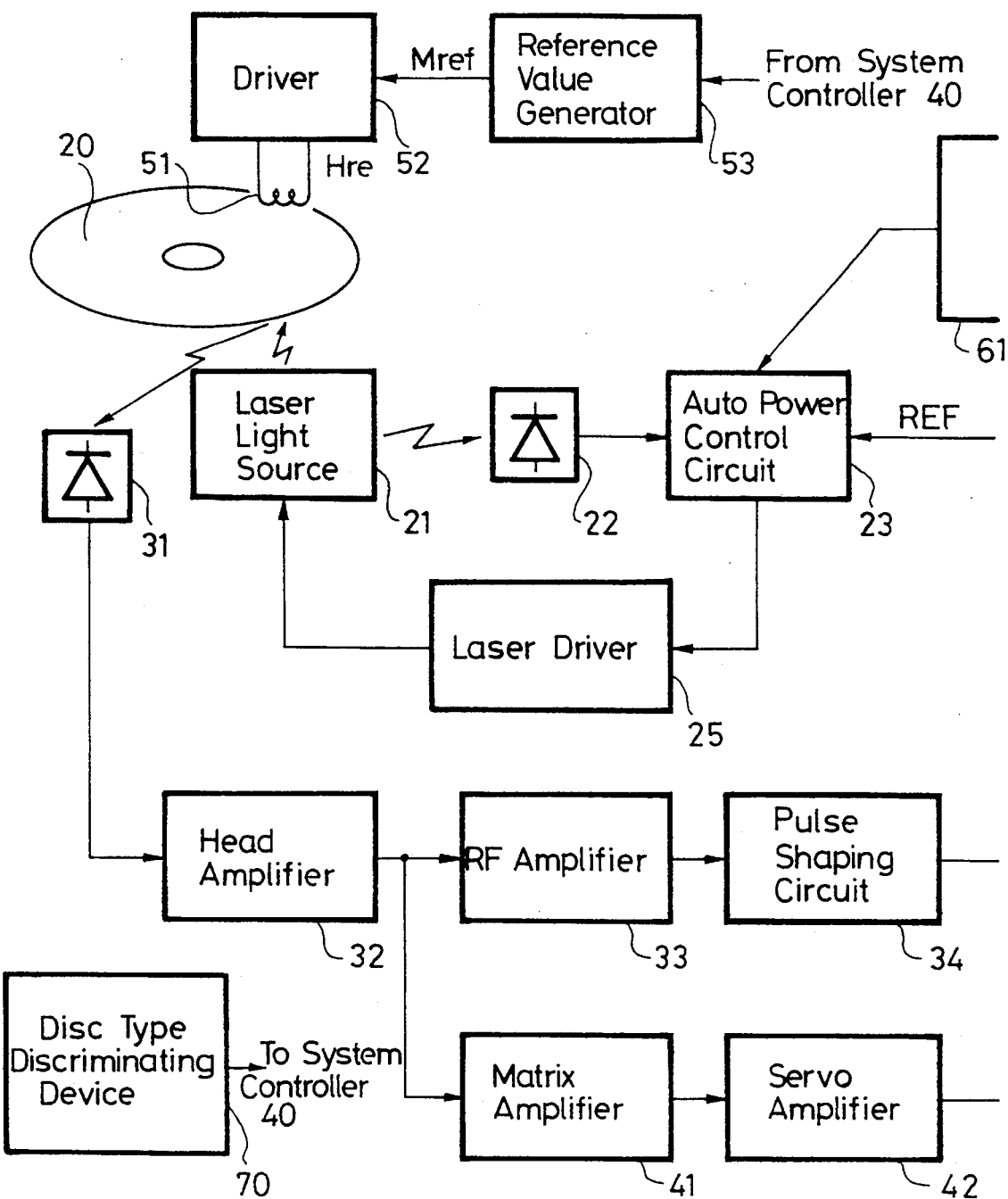
FIG. 12, which is formed of FIGS. 12A and 12B drawn on two sheets of drawings so as to permit the use of a suitably large scale, shows in block form an embodiment of an apparatus for recording and/or reproducing a magneto-optical recording medium.
Figure 12B:
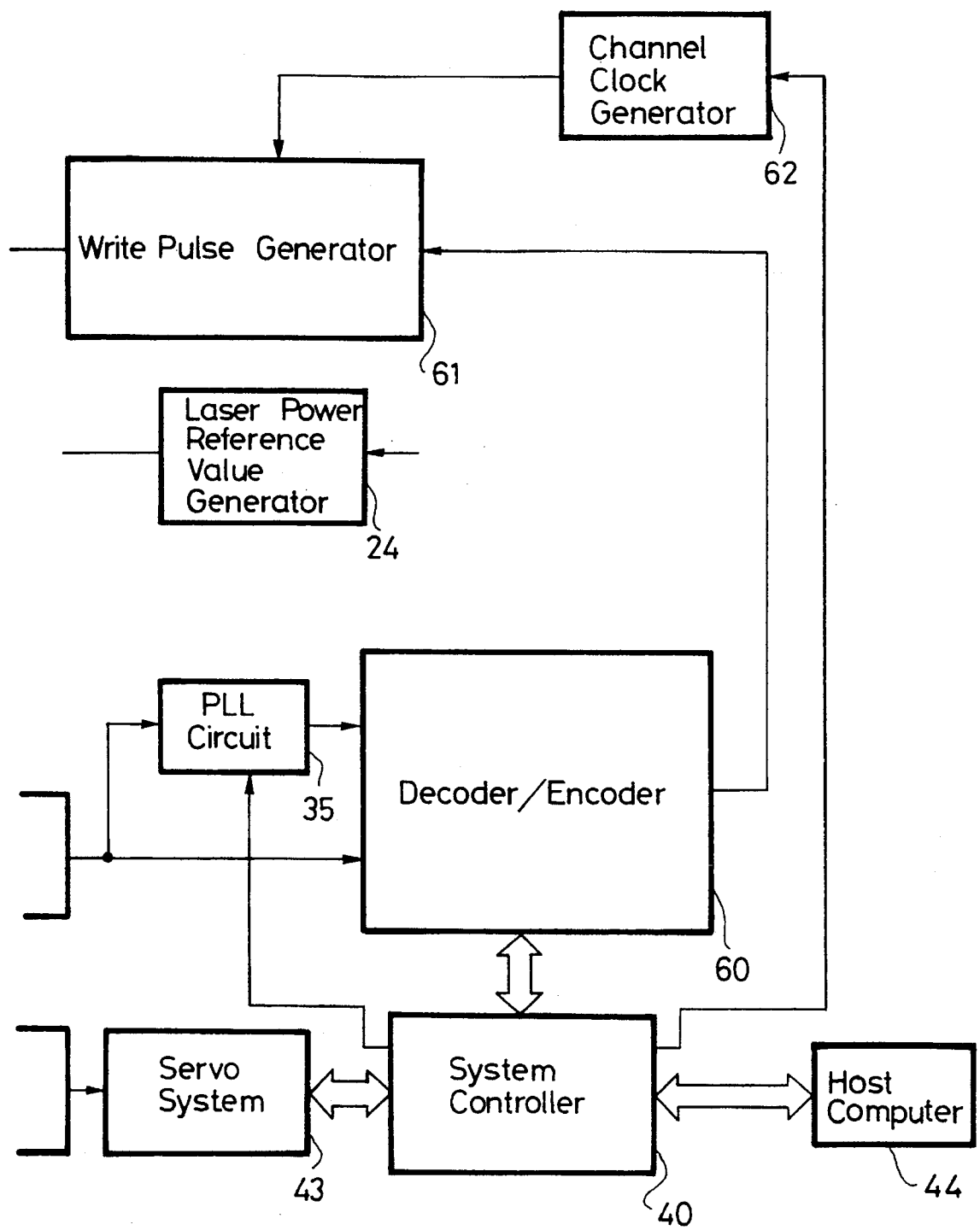

The recording and/or reproducing apparatus of this invention will now be described with reference to a block diagram forming FIG. 12. In this case, FIG. 12 is formed of FIGS. 12A and 12B drawn on two sheets of drawings so as to permit the use of a suitably large scale.

Referring to FIG. 12, a host computer 44 is connected to a system controller 40. The system controller 40 is controlled by an instruction from the host computer 44 to thereby record and/or reproduce the data as will be described later. Also, data is transmitted and received between the system controller 40 and the host computer 44. A servo circuit 43 is connected to and controlled by the system controller 40 to effect the focusing servo, tracking servo and so on.

A disc type identifying or discriminating device 70 is adapted to detect the disc type identifying aperture to determine whether a disc installed on the recording and/or reproducing apparatus is the MSR disc or the MO disc. A disc identifying output signal from the device 70 is supplied to the system controller 40 and the system controller 40 carries out the control corresponding to the MSR disc and the MO disc in response to the disc identifying output signal.

A laser light source 21 is provided to emit a laser beam and the laser beam from the laser light source 21 becomes incident on a magneto-optical disc 20. Part of the laser beam from the laser light source 21 becomes incident on a photo-detector 22 which is used to monitor the laser power. A photo-electrically converted output from the photo-detector 22 is supplied to an auto power control circuit 23. The auto power control circuit 23 compares the output of the photo-detector 22 and a laser power setting reference value REF from a laser power reference value generating circuit 24. A difference output from the generator circuit 24 is supplied to a laser drive circuit 25 to control the output power of the laser light source 21. That is, under the control of the above-mentioned closed loop, the output power of the laser light source 21 becomes a value corresponding to the laser power setting reference value REF.

The laser power reference value generating circuit 24 is supplied with a mode switching signal from the system controller 40 and changes the laser power reference value REF in the recording mode, reproducing mode or in the erasing mode in response to the mode switching signal.

Figure 13:
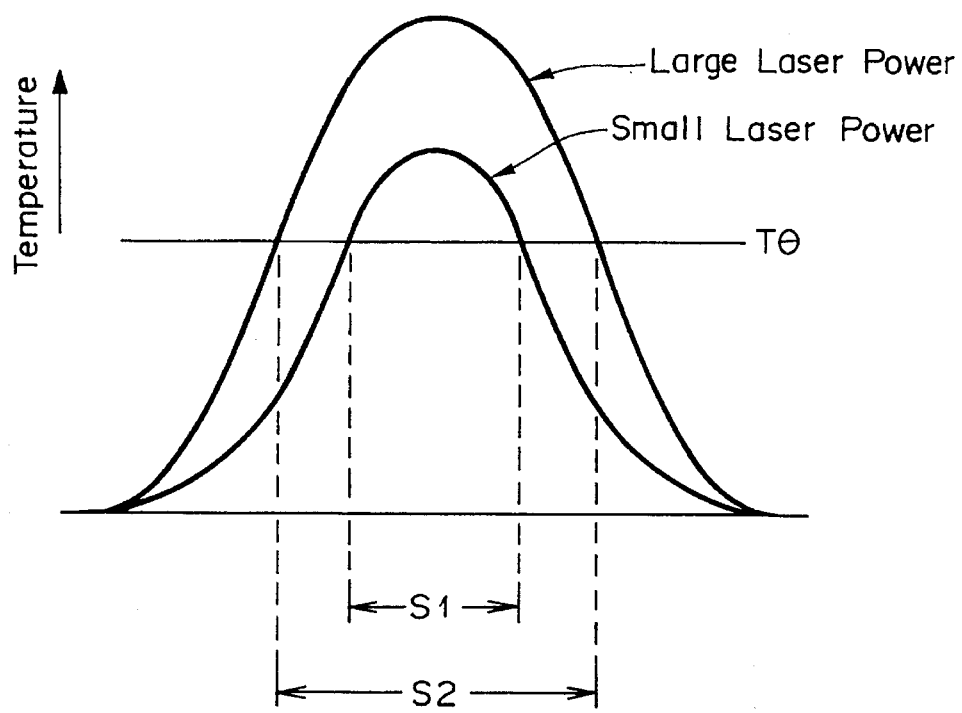
FIG. 13 is a schematic diagram used to explain the state such that a mask area is changed by the change of a laser power.

Also, the laser power reference value REF is changed in accordance with the MSR disc and the MO disc. In this case, the laser power set reference value REF in the playback mode of the MSR disc is set in advance such that the output laser power of the laser light source 21, that is, the area of the reproducing area 9 or 18 falls in a predetermined optimum value. That is, if the laser output power is changed, then the area of the area exceeding a threshold value temperature T0 is changed on the disc as S1 and S2 by the radiation of laser beam as shown in FIG. 13. This area is the high temperature area 14 so that, if the laser power is controlled as described above, then the area of the high temperature area 14 can be made to cover a predetermined area.

If the MSR disc need not be recorded and/or reproduced by the MO disc recording and/or reproducing apparatus, the laser power reference value REF need not always be changed in accordance with the MSR disc and the MO disc.

In the case of this embodiment, an external magnetic field $H_{re}$ is generated by supplying a drive current to a magnetic field generating coil 51 from a driver 52. The magnetic field generating coil 51 is provided at the position opposing the laser light source 21 in the surface side opposite to the surface of the magneto-optical disc 20 radiated by the laser beam. The driver 52 is supplied with a reference value $M_{ref}$ from the reference value generating circuit 53 and drives the magnetic field generating coil 51 such that the magnitude of the external magnetic field $H_{re}$ from the magnetic field generating coil 51 falls in a predetermined value corresponding to the reference value.

The reference value generating circuit 53 is supplied with the mode switching signal from the system controller 40 and controls the magnitude of the external magnetic field $H_{re}$ in response to the recording mode, the reproducing mode or the erasing mode or in response to the MSR disc or the MO disc. That is, in the recording mode and in the erasing mode, predetermined external magnetic fields suitable for the respective modes are generated regardless of the type of the disc. When the MO disc is reproduced, then the external magnetic field is inhibited from being generated. Also, when the MSR disc is reproduced, the aforementioned predetermined reproduced magnetic field $H_{re}$ is generated as this external magnetic field as earlier noted.

A reflected light of the laser beam radiated on the magneto-optical disc 20 from the laser light source 21 is introduced through an optical system (not shown) to a playback photodetector 31, in which it is photo-electrically converted.

An output signal of this photo-detector 31 is supplied through a head amplifier 32 to an RF amplifier 33 provided as a signal processor circuit which then derives an RF signal. This RF signal from the RF amplifier 33 is supplied to and then converted into a digital signal by a pulse shaping circuit 34. This digital signal is supplied to a phase-locked loop (PLL) circuit 35 which derives a clock signal synchronized with the reproduced signal. The PLL circuit 35 is supplied with a control signal from the system controller 40 and varies a synchronizing frequency in response to the difference between recording densities of the MSR disc and the MO disc. In this embodiment, since the channel clock frequencies of the MSR disc and the MO disc are selected in the ratio of 2:1, the PLL circuit 35 may change only the frequency-dividing ratio.

The digital signal from the pulse shaping circuit 34 and the clock signal from the PLL circuit 35 are supplied to a decoder/encoder 60.

The decoder/encoder 60 is controlled in mode by the system controller 40 and extracts the sector control information from the reproduced signal to thereby decode the physical address of each sector. Also, the decoder/encoder 60 decodes the recording data read out from the recording data portion DA. The data thus decoded is supplied through the system controller 40 to the host computer 44. Write data from the host computer 44 is supplied through the system controller 40 to the decoder/encoder 60 and is thereby modulated into data of a predetermined data format, that is, encoded by a (2, 7) modulation (run length limited code).

The write data from the decoder/encoder 60 is supplied to a write pulse generating circuit 61. The system controller 40 supplies a channel clock generating circuit 62 with the switching signal corresponding to the identifying information illustrative of the MSR disc or MO disc. The channel clock generating circuit 62 supplies the write pulse generating circuit 61 with a channel clock which determines a timing at which the write pulse is generated from the generating circuit 61. In this embodiment, if the magneto-optical recording medium is the MSR disc, then a channel clock of frequency twice as high as the normal channel clock for the MO disc is supplied to the write pulse generating circuit 61 by the switching signal.

The write pulse corresponding to the write data from the write pulse generating circuit 61 is supplied to the auto power control circuit 23 at the timing synchronized with the aforementioned channel clock. Upon recording, when the write pulse is added to the reference value REF from the laser power value generating circuit 24, the temperature of the disc is increased more than the Curie temperature of the recording layer, whereby the magnetization of the recording layer is inverted to the direction of the external magnetic field $H_{re}$, thereby the binary value data being recorded.

In this way, data is recorded on the MSR disc and the MO disc. In the case of the MSR disc, the frequency of the channel clock is twice that of the MO disc so that data can be recorded thereon at twice linear recording density.

In the case of the MO disc, the recorded data is reproduced by the scanning of the laser beam spot in substantially the whole area of the spot diameter under the condition such that the external magnetic field $H_{re}$ is zero. At that time, the output clock of the PLL circuit 35 will have a low clock frequency corresponding to the channel clock frequency of the MO disc.

Further, in the case of the MSR disc, the recorded information of high density is read out from the high temperature area narrower than the laser beam spot diameter by the radiation of the laser beam spot on the disc 20 under the condition such that the reproducing external magnetic field $H_{re}$ is generated from the magnetic field generating coil 51. At that time, the output clock of the PLL circuit 35 will have a high clock frequency corresponding to the channel clock frequency of the MSR disc.

The focusing servo and the tracking servo are effected as follows:

As shown in FIG. 12, the output of the head amplifier 32 is supplied to a matrix amplifier 41, and the matrix amplifier 41 generates a focusing servo signal and a tracking servo signal by using outputs of a plurality of divided sensing units of the photo-detector 31. The focusing servo signal and the tracking servo signal from the matrix amplifier 41 are supplied through a servo amplifier 42 to a servo system 43, whereby a focusing lens of an optical system (not shown) is positionally controlled by using, for example, an actuator to effect the focusing control and also positions of a tracking correction lens and an optical pickup are controlled to effect the tracking control. In this embodiment, the servo system can be made common to the MSR disc and the MO disc.

While the MSR disc and the MO disc are discriminated by means of the disc identifying aperture formed through the disc cartridge as described in the above-mentioned embodiment, variations are also possible. For instance, a control track in which a disc identifying information is recorded is formed on the disc in advance so that, when the system is actuated, then the disc can be identified by reading the disc identifying information from this control track. In this case, the control track may be provided only in the MSR disc because the MO disc can be identified without the identifying information.

Further, as the method of identifying the MSR and MO discs, the following method may be possible, in which an area in which a reference signal reproduced by the playback of the front aperture detection type or rear aperture detection type is formed on the MSR disc in advance. More specifically, upon actuation, if this area is placed in the playback mode under the condition such that the external magnetic field is applied thereto, the reference signal can be reproduced from the MSR disc but the reference signal cannot be reproduced from the MO disc. thereby the two MSR and MO discs can be discriminated from each other.

While the output power of the laser light source 21 is controlled by setting the laser power set reference value REF to the proper value so that the area of the high temperature area 14 in the playback mode of the MSR disc may fall in the predetermined optimum value as described in the above embodiment, similar effects can be achieved by controlling the external magnetic field (reproduced magnetic field $H_{re}$).

Figure 4A:
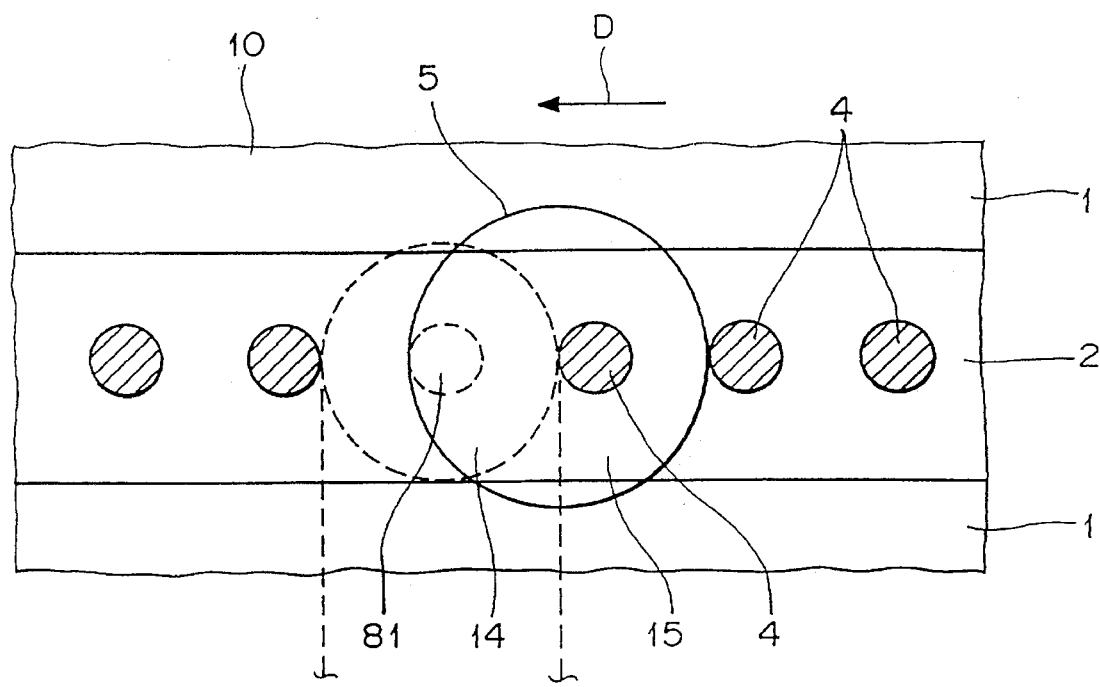
FIGS. 4A and 4B are respectively schematic diagrams used to explain an MSR disc of an erase type.
Figure 4B:
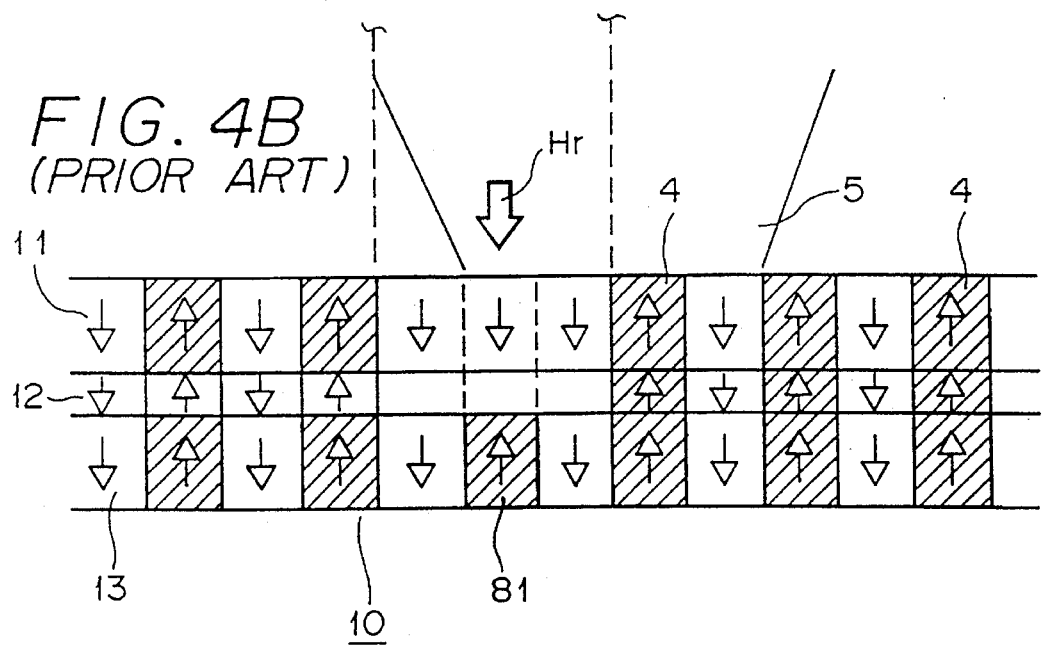

Considering the reproducing method of the erase type, for example, precisely speaking, the temperature at which the high temperature area 14 starts being formed is not the Curie temperature $T_{C2}$ of the intermediate layer 12 in FIG. 4 but is a temperature associated with the reproduced magnetic field $H_{re}$ and which is expressed by the following equation (7);

$$H_{C1}+H_w<H_{re} \qquad (7)$$

where $H_{C1}$ is the coercive force of the reproducing layer 11 and $H_w$ the exchange coupling force between the reproducing layer 11 and the recording layer 13. The exchange coupling force $H_w$ between the reproducing layer 11 and the recording layer 13 is reduced in accordance with the rise of temperature and becomes zero at the Curie temperature $T_{C2}$ of the intermediate layer 12.

Figure 14:
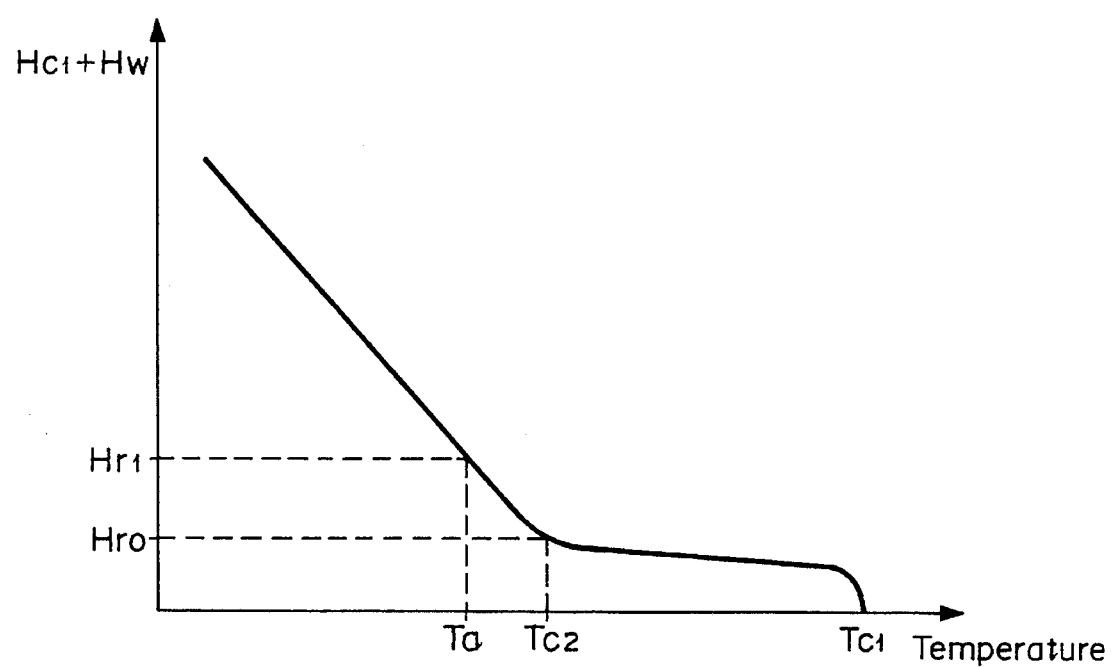
FIG. 14 is a schematic diagram used to explain the state such that a mask area is changed by the change of external magnetic field.

A temperature characteristic of $H_{C1}+H_w$ is illustrated in FIG. 14. In FIG. 14, $T_{C1}$ represents the Curie temperature of the reproducing layer 11 and the coercive force of the reproducing layer 11 becomes similar to that of the single layer at the temperature higher than the Curie temperature $T_{C2}$ of the intermediate layer 12.

In order to arrange the magnetization directions of the reproducing layer 11 of the magneto-optical disc in the same direction, the application of a magnetic field larger than $H_{C1}+H_w$ is needed as shown in the above-mentioned equation (7). Accordingly, even in the same temperature distribution state, if the application of a magnetic field $H_{r0}$ is effected as the application of the reproduced magnetic field $H_{re}$, an area of the range higher than the Curie temperature $T_{C2}$ becomes the high temperature area 14. However, if the magnitude of the reproduced magnetic field $H_{re}$ is equal to $H_{r1}$, an area of the range of temperature Ta lower than the Curie temperature $T_{C2}$ becomes the high temperature area 14 and the size of the high temperature area 14 is changed in response to the magnitude of the reproduced magnetic field $H_{re}$.

Therefore, the size of the high temperature area 14 can be controlled to fall in a predetermined value by controlling the external magnetic field $H_{re}$.

Also in the reproducing method of the rear aperture detection type, the size of the high temperature region 14 can be controlled to fall in the predetermined size by similarly controlling the external magnetic field. Further, the size of the high temperature area 14 in the playback mode of the MSR disc can be controlled to fall in a predetermined value by adjusting both the laser power and the external magnetic field.

As described above, according to this embodiment, by switching the channel clock, the MO disc can be recorded and/or reproduced by the MSR disc recording and/or reproducing apparatus. Further, this MSR disc recording and/or reproducing apparatus has many common portions from a hardware standpoint and therefore can be made compact in size from a circuit scale and space factor standpoint.

A second embodiment of the present invention will be described below. In this embodiment, while the rotational speed and the pre-format are similar to those of the MO disc system similarly to the aforementioned embodiment, the optimum channel clock and data format of the MSR disc are selected.

For the MSR disc, for example, the channel clock is selected to be about 2.5 times the channel clock of the conventional MO disc and the data format employs (1, 7) modulation and the edge recording system for the MSR disc while the data format of the MO disc system is the aforementioned (2, 7) modulation.

Figure 15A:
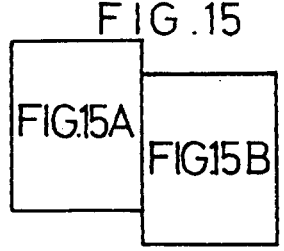
FIG. 15, which is formed of FIGS. 15A and 15B drawn on two sheets of drawings so as to permit the use of a suitably large scale, is a block diagram showing a second embodiment of the apparatus for recording and/or reproducing a magneto-optical disc according to the present invention.
Figure 15A:
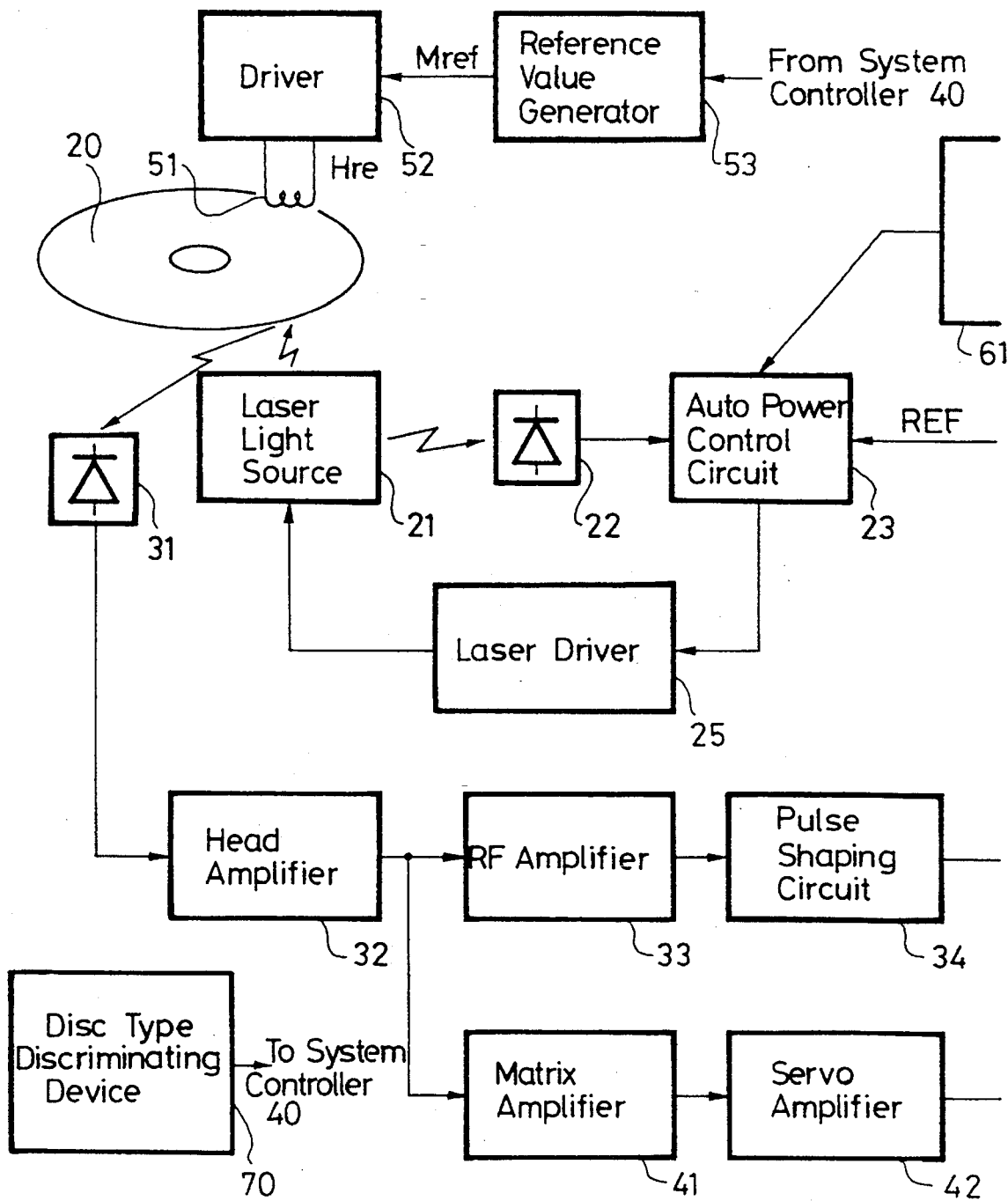
Figure 15B:
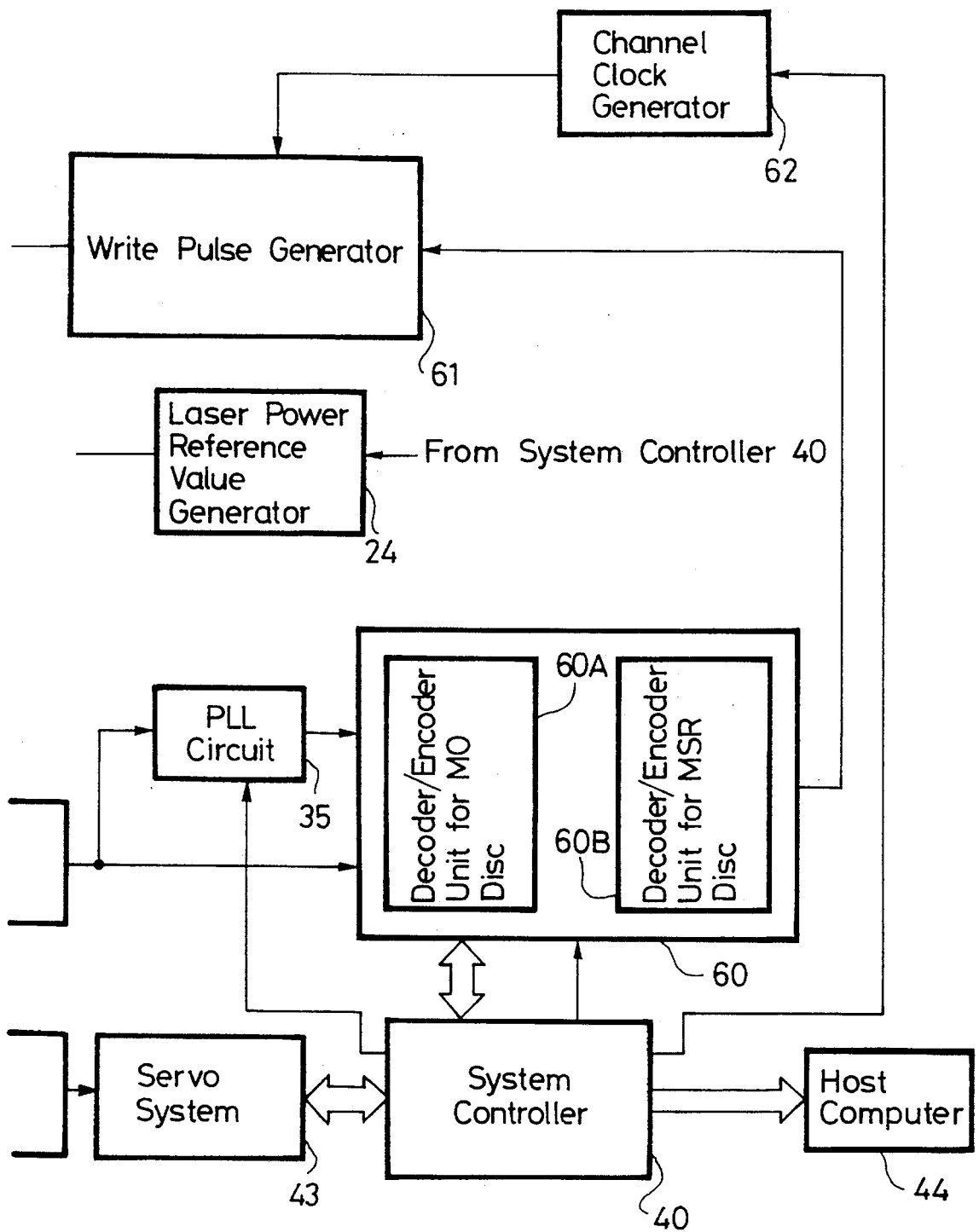

FIG. 15, which is formed of FIGS. 15A and 15B drawn on two sheets of drawings so as to permit the use of a suitably large scale, is a block diagram of the second embodiment of the recording and/or reproducing apparatus according to the present invention. In FIG. 15, like parts corresponding to those of FIG. 12 are marked with the same references and therefore need not be described.

As shown in FIG. 15, the decoder/encoder 60 is comprised of an MO disc decoder/encoder unit 60A and an MSR disc decoder/encoder unit 60B in response to the difference between the data formats of the MO disc and the MSR disc. These decoder/encoder units 60A and 60B are switched in response to the identifying output of the disc type discriminating device 70 when the MO disc is recorded and/or reproduced or when the MSR disc is recorded and/or reproduced. A rest of the circuit arrangements of FIG. 15 is the same as that of the embodiment of FIG. 12.

According to this embodiment, the linear recording density of the MSR disc can be increased.

While a compatibility of the MO disc with the MSR disc is taken into consideration because the data format of the MO disc widely available on the market is not negligible as described above, it can be expected that an MO disc of the next generation will be developed in the future.

Therefore, this embodiment utilizes the data format suitable for recording and/or reproducing the MSR disc as a data format of the MO disc of the next generation. For example, the (1, 7) modulation and the edge recording system are employed and this data format is applied to the recording and/or reproduction of the MSR disc and the MO disc. It is, however, needless to say that the data format most suited to the MSR disc is not limited to the above-mentioned system.

With the above-mentioned arrangement, it is possible to realize a disc recording and/or reproducing apparatus of a small circuit scale which can record and/or reproduce the MO disc with ease while demonstrating the effect of the high recording density of the MSR disc.

As described above, since the high density recording of the MSR disc can be realized without reducing the laser beam spot diameter, the laser beam spot diameter of the conventional MO disc can be utilized without modifications. Therefore, the optical system can be made common to the MSR disc and the MO disc.

Furthermore, even when the MO disc and the recording density are varied in order to demonstrate the effect of the high density recording of the MSR disc at maximum, in the MSR disc recording and/or reproducing apparatus, the MO disc can be recorded and/or reproduced by switching the channel clock. Therefore, the MSR disc recording and/or reproducing apparatus having a compatibility with the MO disc can be realized without increasing the circuit scale too much.

Having described the preferred embodiments of the invention with reference to the accompanying drawings, it is to be understood that the invention is not limited to those precise embodiments and that various changes and modifications thereof could be effected by one skilled in the art without departing from the spirit or scope of the invention as defined in the appended claims.

What is claimed is:

1. An apparatus for reproducing magneto-optical recording mediums, comprising:

means for generating a first channel clock, having a first frequency, used to read data from a magneto-optical super resolution (MSR) type of magneto-optical recording medium, said first type of magneto-optical recording medium having a recording layer, a reproducing layer and an intermediate layer for magnetically coupling said recording layer and said reproducing layer in a stationary state, in which a magnetic coupling between said recording layer and said reproducing layer breaks down in an area in which a temperature is increased to be higher than a predetermined temperature by the radiation of a light upon reproducing and in which a recorded information held on said recording layer is read out from said reproducing layer in the radiated area except the area in which said magnetic coupling has broken down;

means for generating a second channel clock having a second frequency, used to read data from a magneto-optical (MO) type of recording medium in which a recorded information is reproduced by using substantially the whole area of said radiated area, such that the second frequency is not equal to the first frequency;

discriminating means for discriminating said MSR type of recording medium and said MO type of recording medium; and means for switching said first and second channel clocks in response to a discriminating signal from said discriminating means.

2. The apparatus according to claim 1, wherein an identifying information for discriminating said MSR type and MO type of recording mediums is recorded in advance on said recording mediums.

3. The apparatus according to claim 2, wherein said identifying information is recorded in advance only on either said MSR type or MO type of recording medium.

4. The apparatus according to claim 1, wherein said MSR type of recording medium and said MO type of recording medium are the same in speed relative to a radiated light.

5. The apparatus according to claim 4, wherein said MSR type of recording medium and said MO type of recording medium are the same in data format.

6. The apparatus according to claim 1, wherein an information exclusively used for playback recorded in advance on said MSR type of recording medium and an information exclusively used for playback recorded in advance on said MO type of recording medium are reproduced by means of the same channel clock.

7. The apparatus according to claim 1, further comprising:

a first encoder/decoder for carrying out the encoding and decoding corresponding to a data format of said MSR type of recording medium; and a second encoder/decoder for carrying out the encoding and decoding corresponding to a data format of said MO type of recording medium, wherein said first encoder/decoder and said second encoder/decoder are switched in response to said discriminating signal from said discriminating means.

8. The apparatus of claim 1 wherein the first channel clock can be used to write data to the MSR type of recording medium and the second channel clock can be used to write data to the MO type of recording medium.

9. An apparatus for reproducing recording mediums, comprising:

means for generating a first channel clock, having a first frequency, used to read data from a MSR type of recording medium, said MSR type of recording medium having at least a recording layer, a reproducing layer and an intermediate layer interposed between said recording layer and said reproducing layer, in which said recording layer and said reproducing layer are magnetically coupled by means of said intermediate layer in an area in which a temperature is increased to be higher than a predetermined temperature by the radiation of light upon reproducing to thereby transfer a recorded information held on said recording layer to said reproducing layer and in which said recorded information is read out from said reproducing layer from a portion of the radiated area in which recorded information has been transferred to said reproducing layer;

means for generating a second channel clock, having a second frequency, used to read data from a MO type of recording medium in which a recorded information is reproduced by using substantially the whole area of said radiated area, such that the second frequency is not equal to the first frequency;

discriminating means for discriminating said MSR type of recording medium and said MO type of recording medium; and means for switching said first and second channel clocks in response to a discriminating signal from said discriminating means.

10. The apparatus according to claim 9, further comprising means for generating an external magnetic field used to arrange a magnetization direction of said reproducing layer in a constant direction.

11. The apparatus according to claim 9, wherein said recording medium has recorded thereon in advance an identifying information to discriminate said MSR and MO types of recording media.

12. The apparatus according to claim 9, wherein said MSR type of recording medium and said MO type of recording medium are the same in speed relative to a radiated light.

13. The apparatus of claim 9 wherein the first channel clock can be used to write data to the MSR type of recording medium and the second channel clock can be used to write data to the MO type of recording medium.

14. An apparatus for reproducing magneto-optical recording mediums, comprising:

means for generating a first channel clock, having a first frequency, used to read data from a magneto-optical super resolution (MSR) type of magneto-optical recording medium, said first type of magneto-optical recording medium having a recording layer, a reproducing layer and an intermediate layer for magnetically coupling said recording layer and said reproducing layer in a stationary state, in which a magnetic coupling between said recording layer and said reproducing layer breaks down in an area in which a temperature is increased to be higher than a predetermined temperature by the radiation of a light upon reproducing and in which a recorded information held on said recording layer is read out from said reproducing layer in the radiated area except the area in which said magnetic coupling has broken down;

means for generating a second channel clock, having a second frequency, used to read data from a magneto-optical (MO) type of recording medium in which a recorded information is reproduced by using substantially the whole area of said radiated area, such that the second frequency is not equal to the first frequency;

discriminating means for discriminating said MSR type of recording medium and said MO type of recording medium by detection of a disc type identifying aperture; and means for switching said first and second channel clocks in response to a discriminating signal from said discriminating means.

* * * * *